No. 763,837. PATENTED JUNE 28, 1904.
W. H. BAILEY.
HOSE COUPLING.
APPLICATION FILED OCT. 2, 1903. RENEWED MAY 27, 1904.
NO MODEL. 2 SHEETS—SHEET 1.

Witnesses
Inventor
W. H. BAILEY
Attorneys

No. 763,837. PATENTED JUNE 28, 1904.
W. H. BAILEY.
HOSE COUPLING.
APPLICATION FILED OCT. 2, 1903. RENEWED MAY 27, 1904.
NO MODEL. 2 SHEETS—SHEET 2.
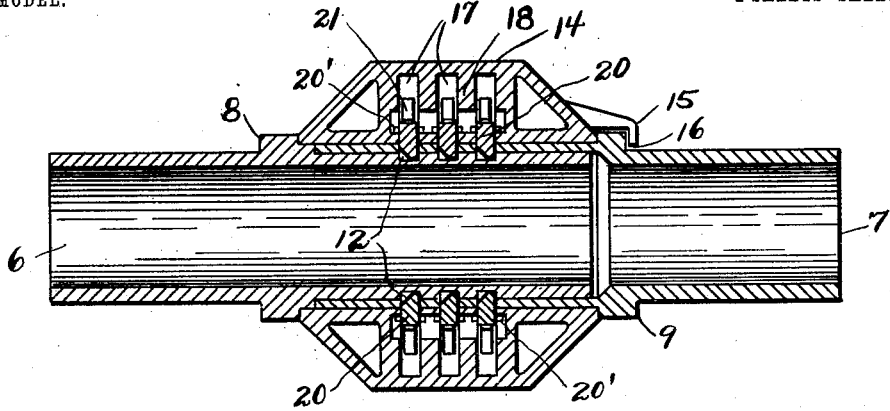
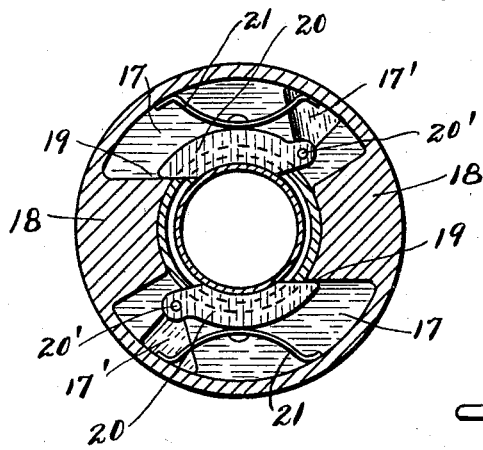
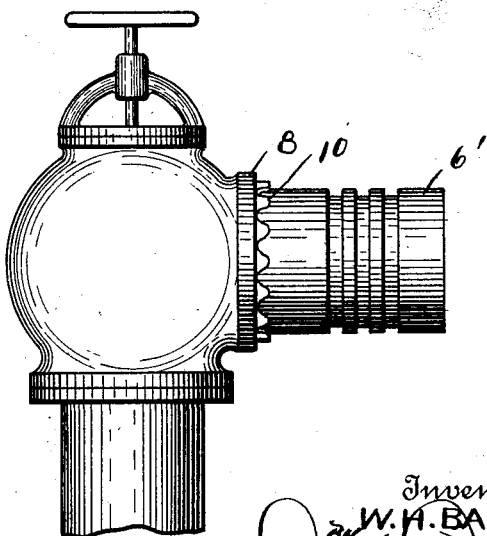

No. 763,837. Patented June 28, 1904.

UNITED STATES PATENT OFFICE.

WILLIAM H. BAILEY, OF MONONGAH, WEST VIRGINIA.

HOSE-COUPLING.

SPECIFICATION forming part of Letters Patent No. 763,837, dated June 28, 1904.

Application filed October 2, 1903. Renewed May 27, 1904. Serial No. 210,082. (No model.)

*To all whom it may concern:*

Be it known that I, WILLIAM H. BAILEY, a citizen of the United States, residing at Monongah, in the county of Marion, State of West Virginia, have invented certain new and useful Improvements in Hose-Couplings; and I do hereby declare the following to be a full, clear, and exact description of the invention, such as will enable others skilled in the art to which it appertains to make and use the same.

This invention relates to hose-couplings; and it has for its object to provide a device of this nature which will tightly hold two sections of hose together and which may be quickly engaged and disengaged.

Figure 1:
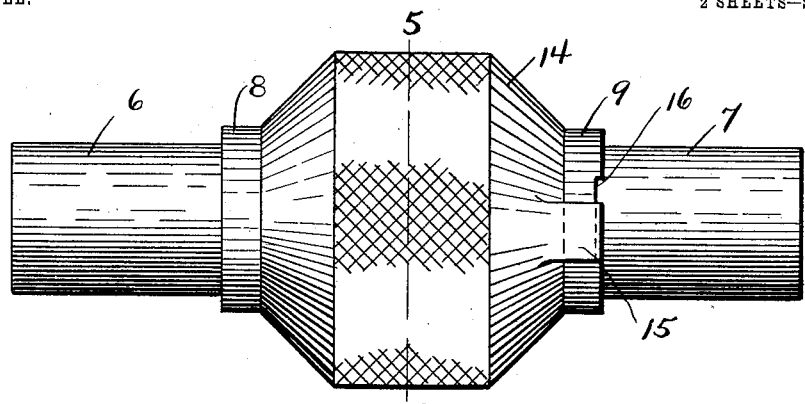
Figure 2:
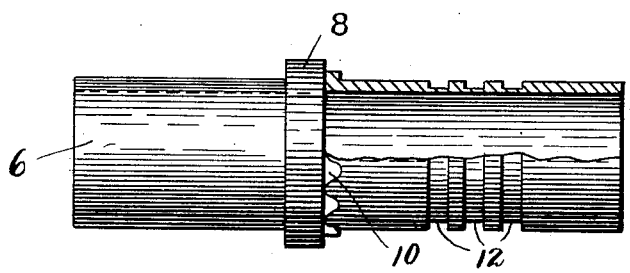
Figure 3:
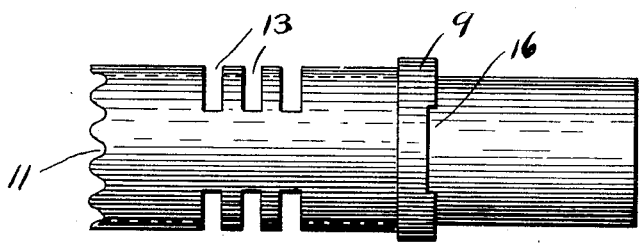
Figure 7:
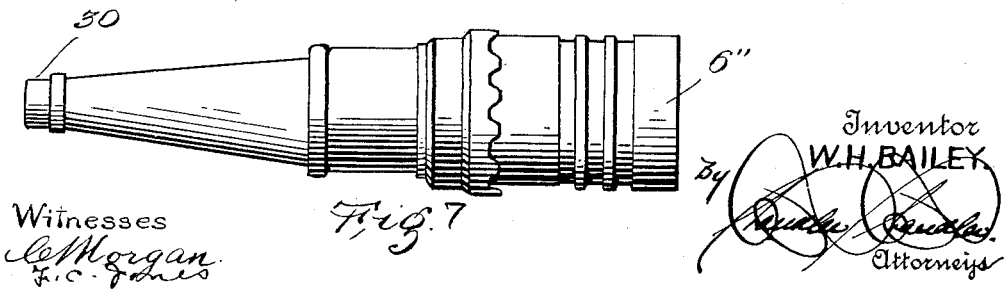

In the drawings, forming a portion of this specification, in which like numerals of reference indicate similar parts in the several views, Figure 1 is a side elevation of the complete coupler. Fig. 2 is a view of the inner pipe-section. Fig. 3 is a view of the outer pipe-section. Fig. 4 is a vertical longitudinal section through the complete device. Fig. 5 is a vertical transverse section on line 5 5 of Fig. 1. Fig. 6 is a view showing the coupling applied to a hydrant. Fig. 7 is a view similar to Fig. 6, showing the invention as applied to a hose-nozzle.

Referring now to the drawings, there are provided two pipe-sections 6 and 7, having collars 8 and 9 thereon, respectively, the collar 8 having a series of projections 10 upon the forward edge thereof. The section 7 is of a size to snugly receive the end of the section 6 therewithin and has a series of notches 11, which are adapted to receive the projections 10 of the collar 8. This registration of the notches and projection prevents the movement of the section 7 upon the section 6. The section 6 has forwardly of the collar 8, and consequently in that portion which lies within the section 7, a plurality of grooves 12, which aline with a corresponding number of slots 13 in the section 7.

Encircling the ends of members 6 and 7 and lying between the collars 8 and 9 is a cylindrical member 14, which is adapted for movement upon the section 7, but which is limited in its movement by a finger 15, lying in a recess 16 of the collar 9. This member 14 is roughened upon its outer surface, thus forming a handhold which may be moved as described above.

Within the member or handhold 14 are a plurality of pockets 17, corresponding in number to the slots and grooves 12 and 13, and are separated from each other by the portions 18, as shown. These pockets communicate with the passage through the handhold and aline with the slots 13 of the section 7. The portions 18 are beveled on one of their faces, as shown at 19, so that each of the pockets 17 has an end at right angles to its curved side and an end at an acute angle thereto. At opposite points upon the sides of the pockets 17 are recesses 17', which are substantially the shape of right-angle triangles, the hypotenuses of which lie at an angle of approximately forty-five degrees to the periphery of the handhold.

Lying within the pockets 17 are catches 20, which project from the pockets into the slots 13 and grooves 12, in which position they are yieldably held by springs 21, which bear at their centers against the catches and at their ends against the inner faces of the walls of the pockets 17. One end of each of the catches 20 is provided with a pair of laterally-projecting lugs 20', which lie within the recesses 17', as shown in Fig. 4. The remaining end of each of the catches is beveled, as shown at 19, and lies against an end of its slot 13. It will thus be seen that if the handhold be turned in the direction of the diagonal ends of the catches these diagonal ends bearing against the ends of the slots 13 will ride up over the ends of the slots and the catches moving upon the lugs 20' will rise clear of the grooves 12, and the section 6 may then be withdrawn from the handhold 14. In reconnecting the sections the section 6 is inserted in the end of the section 7 and is pushed inwardly until its end engages the beveled edge 23 of the catch 20. (Shown in Fig. 4 of the drawings.) This beveled edge causes the catch to ride up over the end of the section 6, and the section may then be pushed home until its grooves aline with the slots 13 and the catches 20 are forced thereinto by the springs 21 to prevent disengagement of the several parts.

In Fig. 6 of the drawings there is shown a hydrant or water-plug, which has a projecting spout 6', which is in the same form as the section 6 and over which the section 7 may be engaged in the manner described above to couple a hose to the hydrant.

In practice modifications of the specific construction shown may be made and any suitable materials and proportions may be used for the various parts without departing from the spirit of the invention.

In Fig. 7 there is shown a hose-nozzle 30, having formed at the base thereof a member 6'', corresponding to the member 6' in Fig. 6 and over which the sections 7 of the coupling may be engaged, as when connecting sections of hose.

What is claimed is—

1. A hose-coupling comprising a pipe-section having a reduced end, a handhold revolubly disposed thereon and spaced from the reduced portion, said reduced portion having slots in the outer face thereof, said handhold having pockets in the inner face thereof in alinement with the slots, a second section having an enlarged end and a resultant shoulder said enlarged end having slots therethrough, disposed with the enlarged end encircling the reduced portion of the first-named section, and its shoulder bearing against the end thereof, and its slots in alinement with the grooves of the reduced portion, blocks pivoted within the pockets and retractable thereinto, and lying normally within alining slots and grooves to prevent separation of the two sections, means for holding the blocks yieldably in their normal positions, said blocks being movable pivotally against the action of the holding means.

2. A pipe-coupling comprising two sections removably disposed one within the other, the inner section having grooves therein and the outer section having slots for alinement with the grooves, a revoluble casing inclosing both sections and having pockets therein, said pockets having triangular recesses at opposite points upon their inner faces, blocks disposed within the pockets and having laterally-projecting lugs disposed within the recesses, means for holding the blocks normally yieldably projected from the pockets, and in engagement with the slots and grooves of the two sections to prevent separation thereof, said blocks being movable pivotally and slidably within the pockets against the action of the holding means.

In testimony whereof I affix my signature in presence of two witnesses.

WILLIAM H. BAILEY.

Witnesses:
W. E. HAGERTY,
F. P. GRAVES.